(12) United States Patent
Bogomolov et al.

(10) Patent No.: US 7,705,752 B2
(45) Date of Patent: Apr. 27, 2010

(54) CHARACTER INPUT APPARATUS AND METHOD FOR MOBILE COMMUNICATIONS TERMINAL

(75) Inventors: Sergey E. Bogomolov, St. Petersburg (RU); Sergey S. Karmanenko, St. Petersburg (RU)

(73) Assignee: LG Electronics Inc., Seoul (KR)

( * ) Notice: Subject to any disclaimer, the term of this patent is extended or adjusted under 35 U.S.C. 154(b) by 215 days.

(21) Appl. No.: 11/441,139

(22) Filed: May 26, 2006

(65) Prior Publication Data

US 2006/0282791 A1    Dec. 14, 2006

(30) Foreign Application Priority Data

May 27, 2005    (KR)    ...................... 10-2005-0045251

(51) Int. Cl.
*H03K 17/94* (2006.01)

(52) U.S. Cl. .......................... 341/22; 345/334; 345/168; 379/368; 715/773

(58) Field of Classification Search .................. 341/22; 715/773; 379/368; 345/156, 334, 168
See application file for complete search history.

(56) References Cited

U.S. PATENT DOCUMENTS

| | | | | |
|---|---|---|---|---|
| 6,016,142 A | * | 1/2000 | Chang et al. | ................. 715/763 |
| 6,307,541 B1 | * | 10/2001 | Ho et al. | ..................... 345/171 |
| 6,731,227 B2 | * | 5/2004 | Horie | .......................... 341/22 |
| 6,765,554 B2 | * | 7/2004 | Millington | ................... 345/156 |
| 6,847,311 B2 | * | 1/2005 | Li | ................................ 341/28 |
| 2004/0021696 A1 | * | 2/2004 | Molgaard | ................... 345/810 |
| 2004/0135774 A1 | * | 7/2004 | La Monica | ................. 345/174 |

* cited by examiner

*Primary Examiner*—Timothy Edwards, Jr.
(74) *Attorney, Agent, or Firm*—Birch, Stewart, Kolasch & Birch, LLP

(57) ABSTRACT

A method for inputting characters on a terminal, which includes displaying virtual character sets on a display screen of the terminal, in which each of the virtual character sets includes a plurality of virtual characters corresponding to physical keys included on a keypad of the terminal. The method also includes selecting a particular virtual character set among the displayed virtual character sets, and selecting a particular virtual character from the selected virtual character set.

4 Claims, 9 Drawing Sheets

CHARACTER INPUT APPARATUS AND METHOD FOR MOBILE COMMUNICATIONS TERMINAL

This application claims priority to Korean Patent Application No. 10-2000-0045251 filed on May 27, 2005, in Korea, the entire contents of which is hereby incorporated by reference in its entirety.

BACKGROUND OF THE INVENTION

1. Field of the Invention

The present invention relates to a method and apparatus for inputting character or text information on a terminal, and more particularly for providing virtual character sets including a plurality of virtual characters on a display of a terminal in which the plurality of virtual characters may be selected by selecting a corresponding physical key on the terminal.

2. Description of the Background Art

To create a text message on a mobile terminal, a user inputs information via an input unit included with the mobile terminal. The input unit generally includes a reduced number of keys for inputting the text message compared to the amount of keys used on a computer, for example.

In more detail, FIG. 1 is an overview illustrating a typical mobile communication terminal. As shown, the mobile terminal includes a keypad with a set of twelve key buttons in addition to cursor keys used to move a cursor on the display. Further, the twelve key buttons are arranged in four rows and three columns, and each key button is assigned a different character or numeral. For example, the numerals 0 to 9 and the special characters "*" and "#" are assigned to the key buttons. Thus, the user can enter telephone numbers by selecting the appropriate key buttons. In addition, the user can also write a text message by selecting the appropriate text message menu option and then selecting the different key buttons to create the text message.

For example, to create the word "APPLE" as shown on the display in FIG. 1, the user would select the key button 2 (to select the letter A); the key button 7 (to select the letter P); the cursor key to indicate a next letter was to be selected; the key button 7 (to again select the letter P); the key button 5 three times (to select the letter L); and the key button 3 two times (to select the letter E).

Thus, the user would have to select a total of nine key buttons to enter the word "APPLE." That is, because the key buttons 1-9 are assigned three alphabet characters, the user has to repeatedly press the same key button to input one of the particularly desired characters. Therefore, it takes a long time to create a relatively long text message. This is inconvenient for the user. In addition, because the number of key buttons is limited to twelve, the number of available characters is also limited.

SUMMARY OF THE INVENTION

Accordingly, one object of the present invention is to address the above noted and other problems.

Another object of the present invention is to provide a character or text inputting method and apparatus that allow a user to conveniently compose messages by providing a plurality of virtual character sets on a display screen.

To achieve these and other advantages and in accordance with one aspect of the present invention, as embodied and broadly described herein, there is provided a method for inputting characters on a terminal, which includes displaying virtual character sets on a display screen of the terminal, in which each of the virtual character sets includes a plurality of virtual characters corresponding to physical keys included on a keypad of the terminal. The method also includes selecting a particular virtual character set among the displayed virtual character sets, and selecting a particular virtual character from the selected virtual character set.

According to another aspect, the present invention provides a character input apparatus for a terminal, which includes a display configured to display virtual character sets, a keypad having a plurality of physical keys used to allow movement between the displayed virtual character sets and virtual characters included in the virtual character sets, and a controller configured to move between the displayed virtual character sets and to select a particular virtual character among the virtual characters based on selection of the plurality of keys included in the keypad.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

The present invention provides users with virtual character sets having a same arrangement as that of a terminal keypad, and allows the users to compose messages by selecting a particular virtual character by pressing a key button on the keypad that corresponds to the desired virtual character. The virtual character sets are displayed on a display of the mobile terminal.

Figure 2:
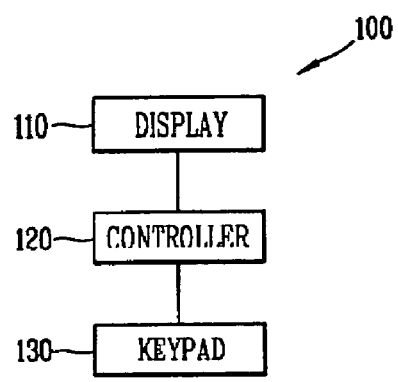
FIG. 2 is a block diagram illustrating a character inputting apparatus for a terminal in accordance with an embodiment of the present invention.

Turning first to FIG. 2, which is a block diagram of a character inputting apparatus 100 for a terminal in accordance with the present invention. As shown, the apparatus 100 includes a display 110, a controller 120, and a keypad 103. As noted above, the virtual character sets or keyboard layouts are displayed on the display 110. Further, the keypad 130 includes a plurality of key buttons that may be selected by the user. The controller 120 controls the operations of the character inputting apparatus 100 of the present invention.

Figure 3:
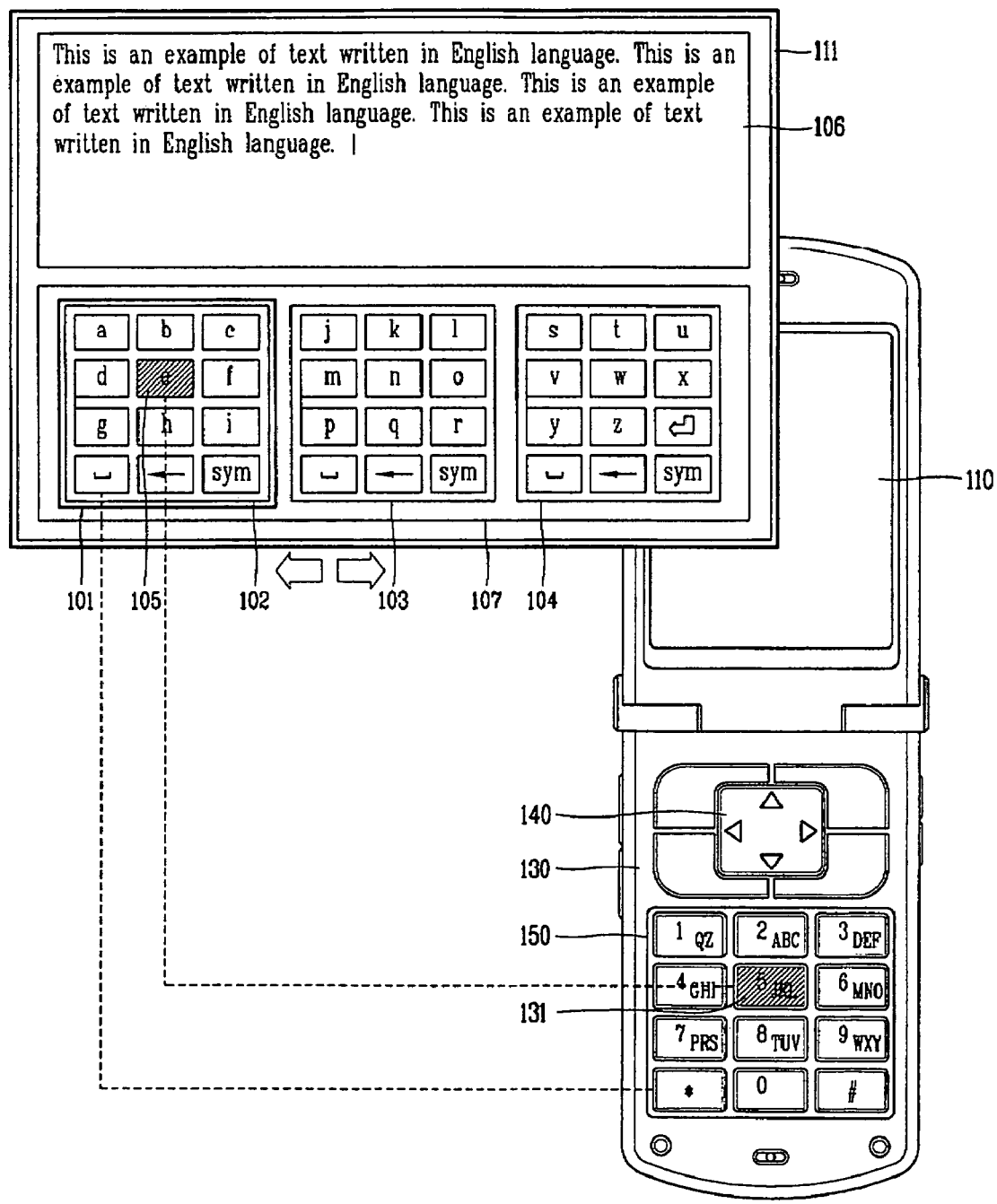
FIG. 3 is a conceptual view of a character inputting apparatus in accordance with an embodiment the present invention.

Turning next to FIG. 3, which illustrates a relationship between the displayed virtual character sets and the keys on the keypad 130. FIG. 2 will also be referred to in this description. Note that the displayed virtual character sets are not shown as being displayed directly on the display 110, but rather for clarity purposes are enlarged and shown as being separate from the display 110.

As shown in FIG. 3, the virtual character sets have a graphical (virtual) keyboard layout including in this example three sections: a first section 102, a second section 103, and a third section 104. In addition, each section includes twelve graphically displayed keys that can be selected by selecting a corresponding key on the keypad 130. In addition, the three sections 102-104 have a key button orientation that resembles a so-called "qwerty" keyboard ("qwerty" are the six keys in the upper left hand of a keyboard). This particular type of keyboard layout make it easier for the user to select one the of virtual keys because the user is generally familiar with a "qwerty" type of keyboard. Other input arrangements may also be used.

Further, as shown in FIG. 3, when the user wants to write a text message, for example, the user selects the appropriate text message menu option, and a display screen 111 is displayed on the display 110. Note that the display screen 111 includes a text input area 106 and a character input area 107.

In addition, as shown in FIG. 3, the first section 102 is highlighted by locating or moving a cursor using a cursor button 140 into the first section 102. The highlighted first section 102 is illustrated as a highlight portion 101. In addition, with reference to FIG. 3, each key button in the first section 102 corresponds with another key in the keypad 103. For example, the highlighted virtual key "e" may be selected by selecting the corresponding key 131 (i.e., the key button number 5) on the keypad 130. In addition, the highlighted virtual key "a" may be selected by selecting the corresponding key button number 1 on the keypad 130.

Thus, in accordance with an embodiment of the invention, the keypad 130 includes a set of physical key buttons 150 that correspond to the arrangement of the virtual key buttons of the character sets 101-103. The keypad 130 also includes the cursor buttons 140 that may be selected to move within each virtual section 102-104 or between each virtual section 102-104. In the example shown in FIG. 3, the set of key buttons 150 includes twelve keys (e.g., the key 131, etc.) and four separate cursor buttons 140. Alternatively, a single cursor button (e.g., a 4-direction rocker key) may be used as the cursor button 140.

Thus, the user can select characters from among the multiple virtual character sections 102, 103 and 104 displayed on the display 110 using the cursor buttons 140, and thereafter press a corresponding key button on the keypad 130. In addition, as shown in FIG. 3, each section 102-104 is highlighted or popped up on the display 110 when the user moves the cursor over the respective section 102-104. In addition, the controller 120 processes an input signal of the key button of the keypad 130 to select a corresponding virtual character in the character sections 102-104. The controller 120 also controls the operations for displaying the virtual character sets on the display 110.

Turning next to FIGS. 4-7 which are diagrams illustrating different arrangements for displaying the virtual characters on the display of the terminal. In more detail, FIG. 4A illustrates displaying a first set of characters (i.e., a first keyboard layout), and FIG. 4B illustrates displaying a second set of character (i.e., a second keyboard layout) that is obtained by selecting the shift key, for example. Note that the first set of characters in FIG. 4A is lower case English characters and the second set of characters in FIG. 4B is the corresponding upper case English characters.

In addition, as shown, the first and second character sets include three sets of characters with each character set having twelve key buttons arranged in four rows and three columns. In addition, in the example shown in FIGS. 4A and 4B, many of the keypad buttons are assigned two characters so as to allow the user to select two different characters using only one key button. For example, the first keypad button in the upper leftmost corner of the first set of characters includes the character "q" and the numeral "1". Thus, the user can select the character "q" by selecting the corresponding key on the keypad 103 (i.e., the key number 1 in FIG. 3) and may select the numeral "1" by pressing the corresponding key on the keypad 103 twice in rapid succession.

Alternatively, the selection of the first and second character/numeral is determined by the length of time that the corresponding key button has been depressed. For example, when the key is normally pressed (i.e., lightly pressed and immediately released), the first character is selected. However, when the key is depressed for a certain length of time (e.g., two seconds or more), the different second character is selected.

Figure 4A:
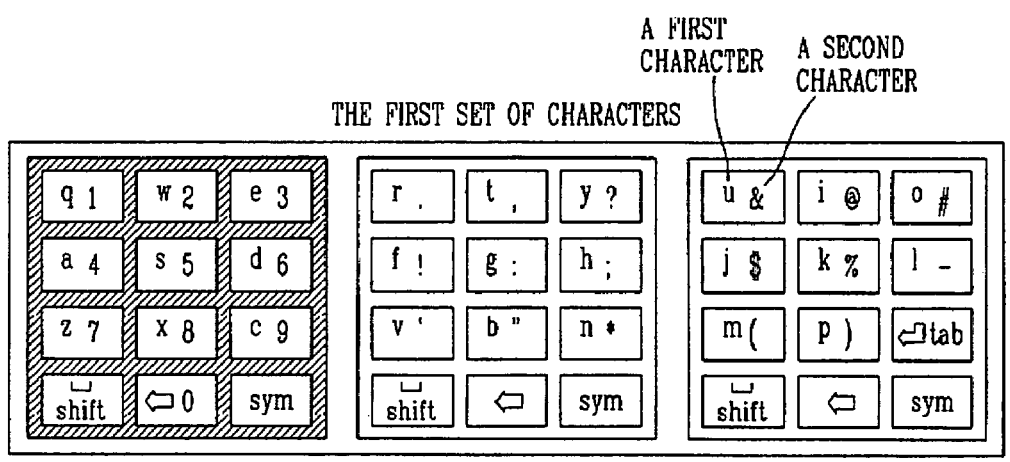
FIGS. 4A and 4B are diagrams illustrating different character sets in accordance with an embodiment of the present invention.

In addition, as noted above, FIG. 4B illustrates the upper case English characters. The characters in FIG. 4B may be displayed by selecting the shift key (e.g., the "*" key), for example, when the first set of characters in FIG. 4A are displayed. The second set of characters also three sets of characters. Further, the arrangement of the key buttons in four rows and three columns is identical to that of the set of key buttons on the terminal. Accordingly, the user can select a virtual character by pressing the corresponding key button on the terminal.

Figure 4B:
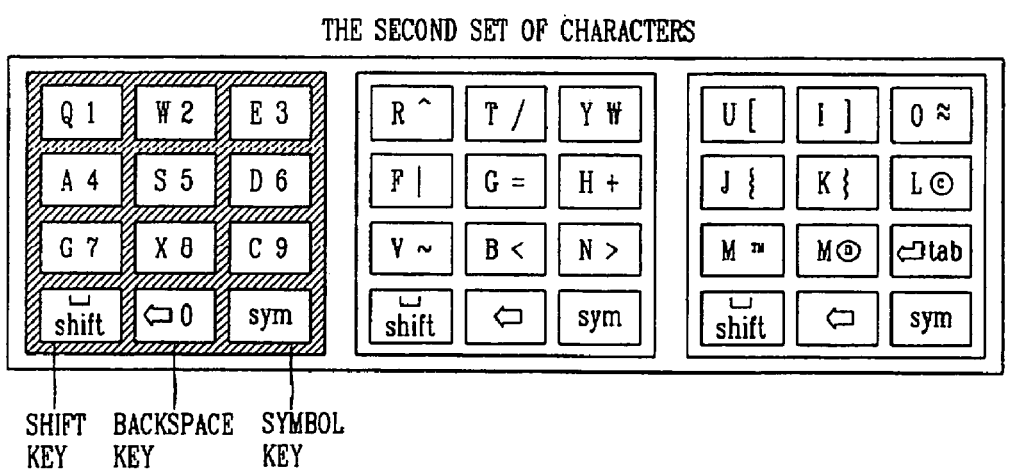

In addition, when the user is viewing the first set of characters in FIG. 4A and wants to select a corresponding upper case character in FIG. 4B, the user can simultaneously select the shift key and a particular key button from the first set of characters to input a corresponding character in the second set of characters of FIG. 4B. Thereafter, the display immediately returns to the screen for the first set of characters of FIG. 4A, which was the initial screen.

In addition, with reference to FIGS. 4A and 4B, the number of characters that can be selected is a total of 144 characters. That is, the first set of characters includes three sections, each section having 12 keys. Further, each key can be assigned two characters/numerals such that the first set of characters includes 72 possible character/numeral selections. Similarly, the second set of characters shown in FIG. 4B includes 72 possible character/numeral selections for a total of 144 possible selections. However, the number of characters to be inputted may be flexibly changed according to the number of dedicated (key) buttons assigned to the keypad buttons such as a back space key in addition to the shift key and the symbol key (#) of FIGS. 4A and 4B.

Figure 5A:
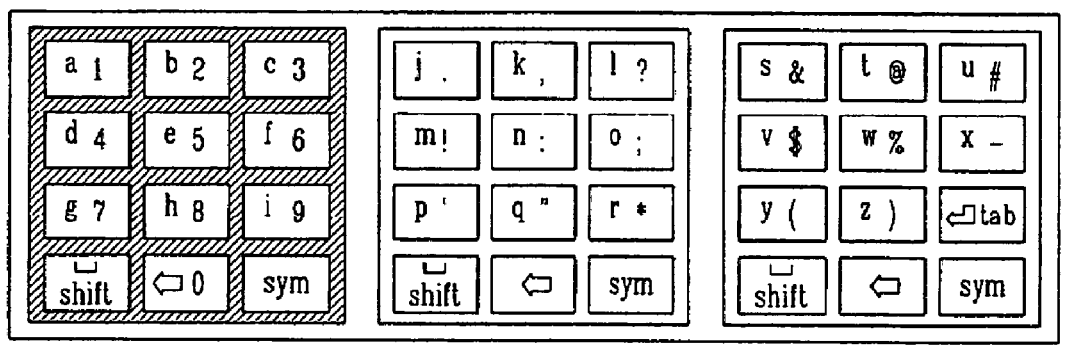
FIGS. 5A and 5B are further diagrams illustrating other character sets in accordance with an embodiment of the present invention.
Figure 5B:
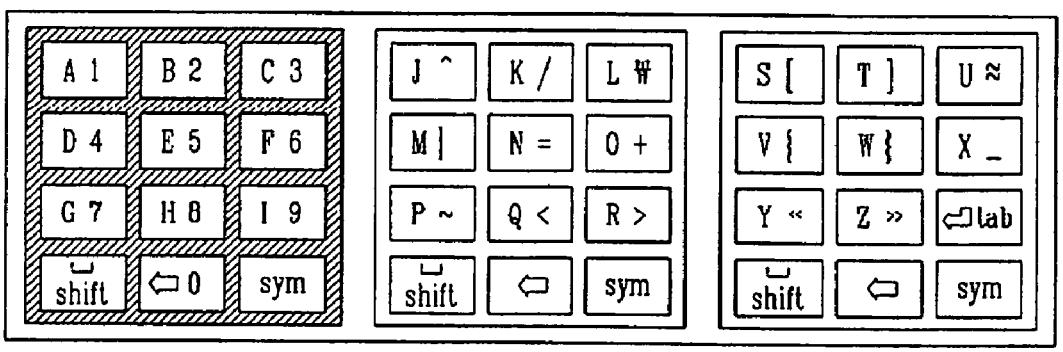
Figure 6A:
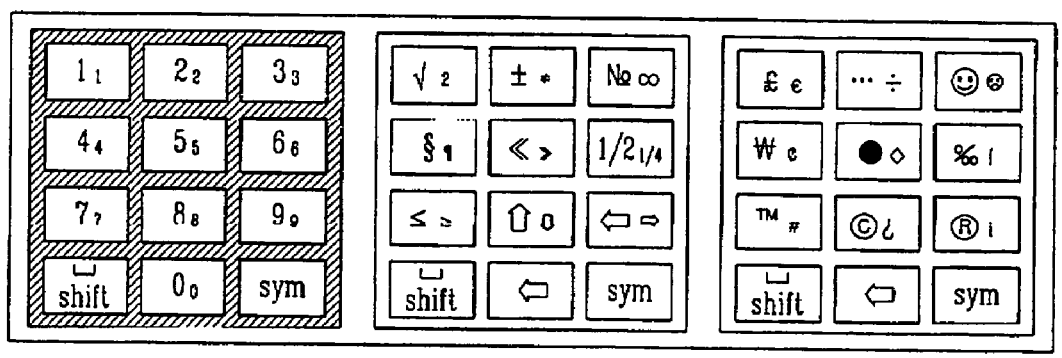
FIGS. 6A and 6B are still further diagrams illustrating other character sets in accordance with an embodiment of the present invention.
Figure 6B:
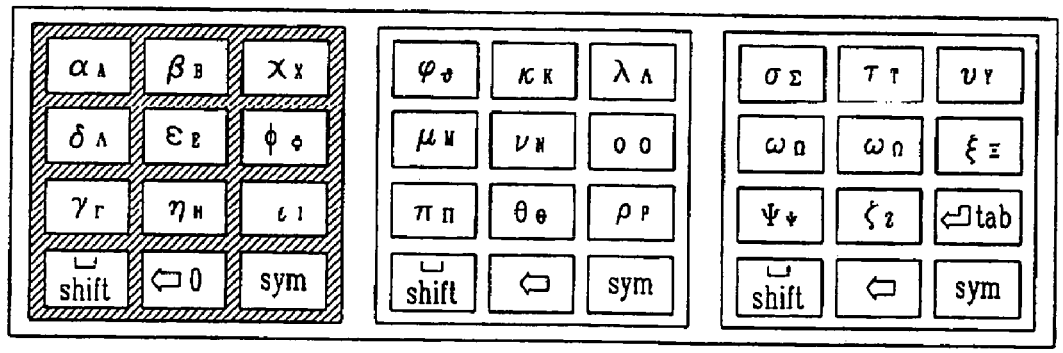

Also, FIGS. 5A and 5B are diagrams illustrating other sets of characters displayed on the display of the terminal. In more detail, FIGS. 5A and 5B are similar to FIGS. 4A and 4B, except for the particular characters assigned to the key buttons. In addition, FIGS. 6A and 6B are also similar to FIGS. 4A and 4B, except that the characters assigned to the key buttons generally include special characters and other symbols. The user may display the character sets including the special symbols shown in FIGS. 6A and 6B by pressing a symbol key (#) or activating some other function.

Figure 7:
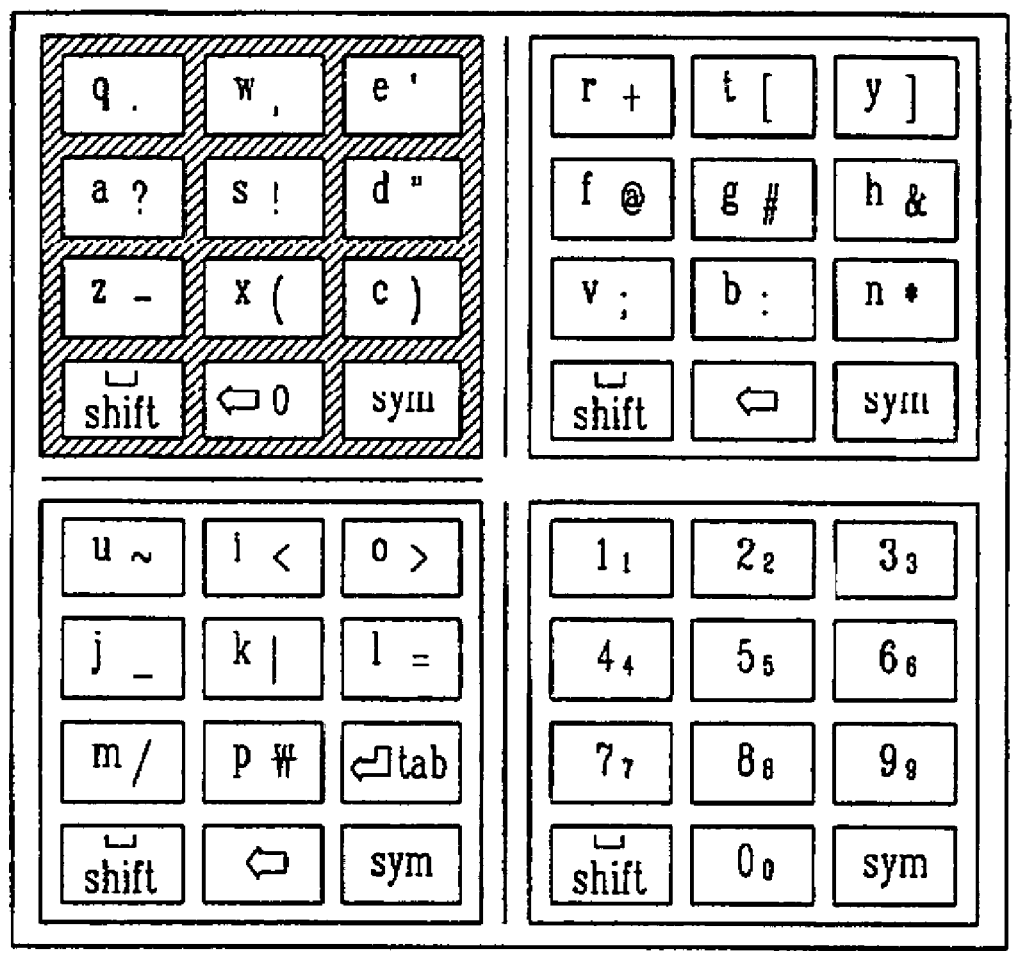
FIG. 7 is a diagram illustrating four characters sets displayed next to each other in accordance with an embodiment of the present invention.

Turning next to FIG. 7, which is a diagram illustrating four sets of characters displayed next to each other on a display of a mobile terminal in accordance with an embodiment of the present invention. As shown, the four sets of characters are arranged in two rows and two columns, and accordingly more key buttons can be provided, as compared with the previous shown three sets of characters. The actions for selecting a particular key button are similar to that as discussed above.

In addition, the number of character sets and their arrangement, as well as the character types assigned to the key buttons can be variously implemented according to the user's intended use. Therefore, if necessary, character sets including only foreign language characters can be provided to allow a user to compose messages written in the corresponding foreign language.

Figure 8:
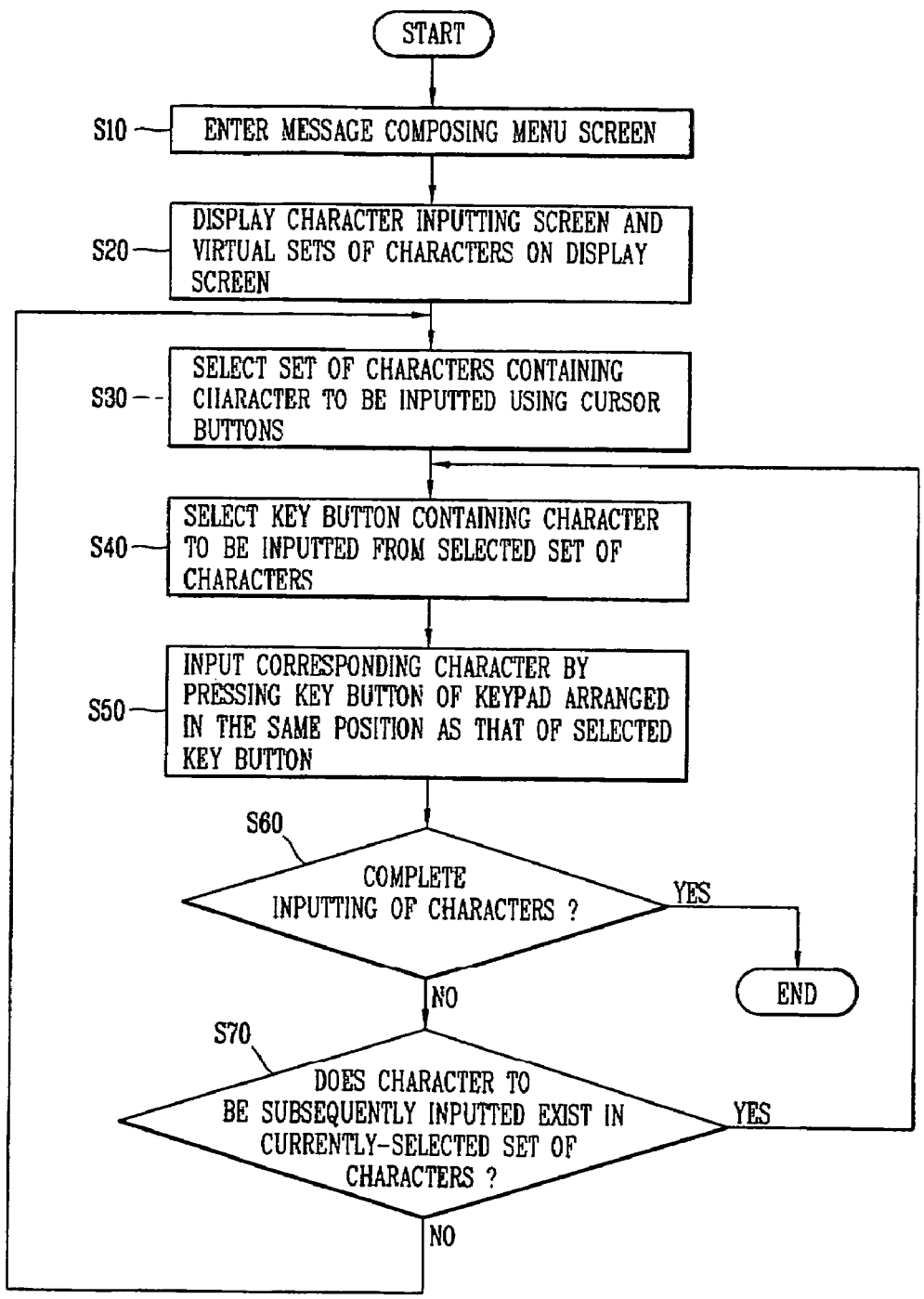
FIG. 8 is a flowchart illustrating a character inputting method for a terminal in accordance with the present invention.

Next, FIG. 8 is a flowchart illustrating a method for composing a text message in accordance with an embodiment of the present invention. The displayed character sets shown in FIGS. 3-5 will also be referred to in this discussion. As shown, when the user wants to create a message, he or she selects the appropriate menu option to display a message composing screen on the terminal (S10). For example, the message composing screen 111 in FIG. 3 can be displayed on the display 110 of the terminal. Then, a character inputting screen and virtual character sets are displayed (S20). For example, as shown in FIG. 3, the character inputting screen 106 and the virtual character set 107 are displayed within the message composing screen 111.

In addition, as discussed above, the cursor keys 140 may be used to highlight or pop up one of the character sets 101-103 and a particular character within the character sets 101-103 (S30 and S40). Further, the highlighted particular character within the character set is the selected by selecting a corresponding key button on the keypad of the terminal (S50). For example, with reference to FIG. 3 and as discussed above, the user may select the highlighted character "e" in the first character set section 101 by selecting the key button 131 on the key button 150.

The method then determines if the user has completed the input of all characters (S60). For example, when the user has completed the input of all characters, he or she may press a particular End or OK key, for example, indicating he or she has completed the input of the text message. If the method determines all characters have been input (Yes in S60), the method ends (e.g., the text message is transmitted to an intended user or the message is stored in a memory of the terminal for later use).

However, when the method determines that not all of the characters have been input (No in S60), the user determines whether a next character to be input exists in the currently-selected set of characters (S70). If the desired character is not contained within the currently-selected displayed character set (No in S70), the user repeats steps S30 to S60, thereby composing a message. If the character is contained with the currently-selected character set (Yes in S70), the user repeats steps S40-S60.

For example, and with reference to FIG. 4, to create the message "Congratulations!", the user would select the following key buttons on the keypad 150 shown in FIG. 3:

*+3; ➡; 6; 5; ⬅; 7; ➡; 9; ⬅; 1; ⬅; 2; 3; ⬅; 3; ⬅; 1; ⬅; 2; ➡; 9; ➡; 6; 5; ➡; 1; ⬅; 4 (long).

Figure 1:
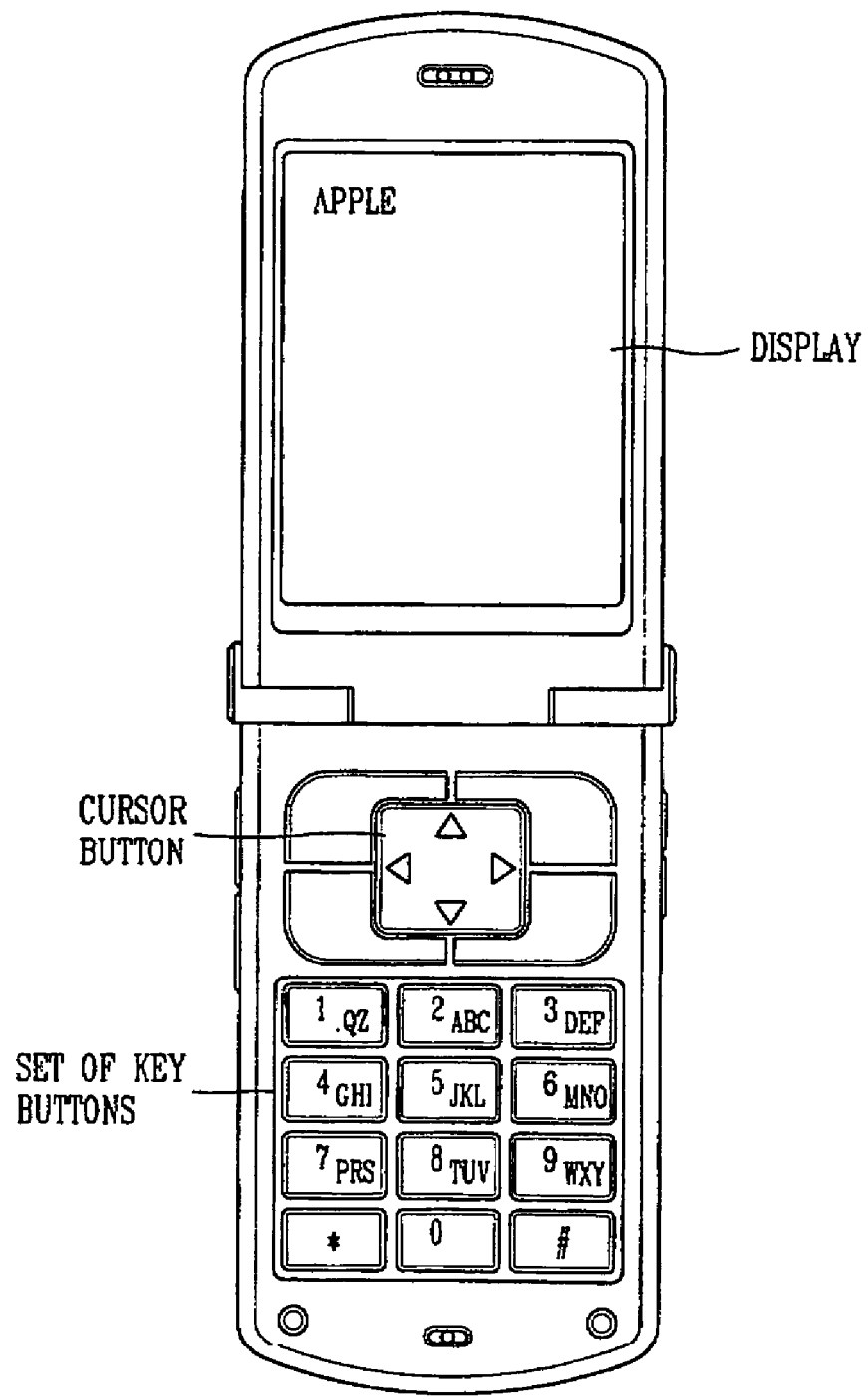
FIG. 1 is an overview illustrating a mobile communication terminal.

Thus, in accordance with an embodiment of the present invention, to type the word "Congratulations", the key buttons must be pressed 28 times. However, according to the related art shown in FIG. 1, the key buttons must be pressed 38 times to type the same word.

Figure 9:
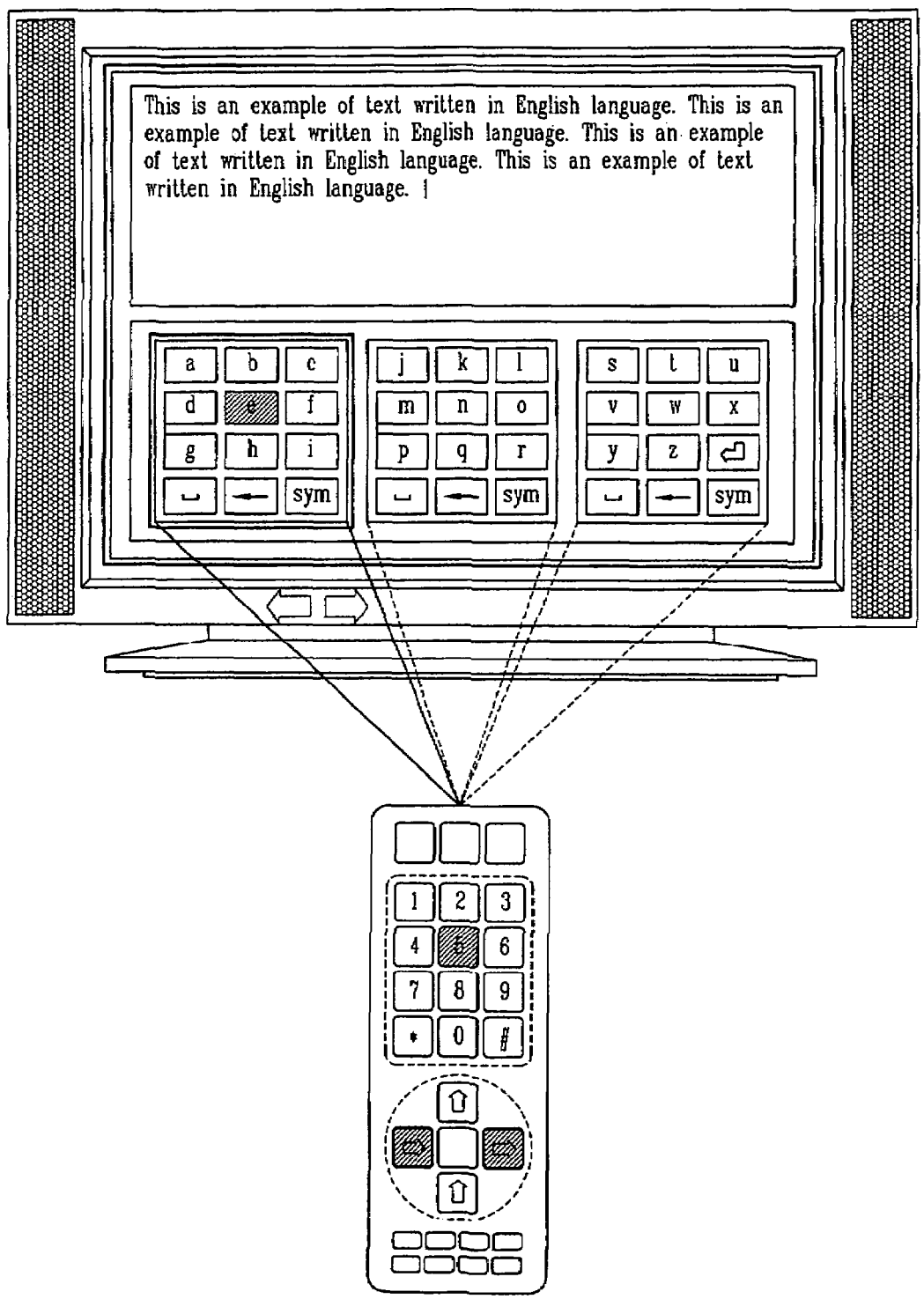
FIG. 9 is a conceptual view illustrating a character inputting method using a remote controller of a home appliance in accordance with an embodiment of the present invention.

In addition, the above descriptions correspond to a user inputting a message on a mobile terminal. However, the present invention also relates to a remote control for consumer electronic devices or home appliances such as a TV, a video player, etc. as well as wired/wireless telephones. For example, FIG. 9 illustrates a method for inputting characters (text) using a keypad of a remote controller of a TV-set as an embodiment of the present invention.

Thus, as described above in detail, the present invention provides an input apparatus for an electronic device, which includes a display screen, a physical keypad with multiple input keys, and a controller cooperating with the display screen and the physical keypad to display two or more virtual keypads. Further, each virtual keypad includes graphical buttons respectively corresponding to the input keys of the physical keypad used by a user to input information.

Also, the physical keypad also includes a selection key that allows the user to select one of the displayed virtual keys. As shown in FIG. 3, the input information may be displayed on a first portion 106 of the display screen 111 and the virtual keypads may be displayed on a second portion 107 of the display screen 111. The virtual keypads may also represent at least two different types of information that the user can input using a single input key of the physical keypad. In addition, the at least two different types of information can be distinctively input via the physical keypad according to a time duration during which the single input key is depressed. Also, the first type of information may relate to alphabet letters of a standard keyboard, and the second type of information may relate to numerals and symbols.

As described above, using the character input method in accordance with an embodiment of the present invention, the user can effectively select and input many types of characters, numerals, mathematical formula, special characters, special symbols, etc. using the terminal having a limited number of key buttons. Also, because a plurality of virtual sets of characters (i.e., keyboard layouts) are provided on the display screen, the user can input many types of characters, which advantageously reduces the time needed to input characters and text. In addition, because the present invention can be implemented even using the keypad of the remote controller of a home appliance, for example, it is possible to enlarge the application range of the present invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for inputting characters on a terminal, said method comprising:

simultaneously displaying a plurality of virtual character sets on a display screen of the terminal, each of said virtual character sets including a plurality of virtual characters corresponding to physical keys included on a keypad of the terminal;

selecting a particular virtual character set among the displayed virtual character sets; and selecting a particular virtual character from the selected virtual character set, wherein the plurality of virtual characters included in the character sets comprise selectable key buttons that can be selected by selecting a corresponding physical key included on the keypad of the terminal, wherein selection of either of two characters on the key button is distinguished by a length of time that the key button is depressed, wherein the particular virtual character set and the particular virtual character are only selected by a physical key included on the key pad of the terminal, and wherein the virtual characters included in the virtual character sets are displayed on the display of the terminal in a same pattern or array as the physical keys included on the keypad of the terminal are arranged.

2. The method of claim 1, wherein a second character of the two characters is selected when the key button is continuously depressed for a time period that is longer than a time period for selection of a first character of the two characters.

3. A character input apparatus for a terminal, said apparatus comprising:

a display configured to simultaneously display a plurality of virtual character sets;

a keypad having a plurality of physical keys used to allow movement between the displayed virtual character sets and virtual characters included in the virtual character sets; and a controller configured to move between the displayed virtual character sets and to select a particular virtual character among the virtual characters based on selection of the plurality of keys included in the keypad, wherein the controller distinguishes the selection of either of two characters on the key button by a length of time that the key button is depressed, wherein the particular virtual character set and the particular virtual character are only selected by a corresponding physical key included on the key pad of the terminal, and wherein the virtual characters included in the virtual character sets are displayed on the display of the terminal in a same pattern or array as the physical keys included on the keypad of the terminal are arranged.

4. The apparatus of claim 3, wherein the controller selects a second character of the two characters when the key button is continuously depressed for a time period that is longer than a time period for selection of a first character of the two characters.

* * * * *